E. G. GODDARD.
CAR-STARTER.
No. 170,546. Patented Nov. 30, 1875.
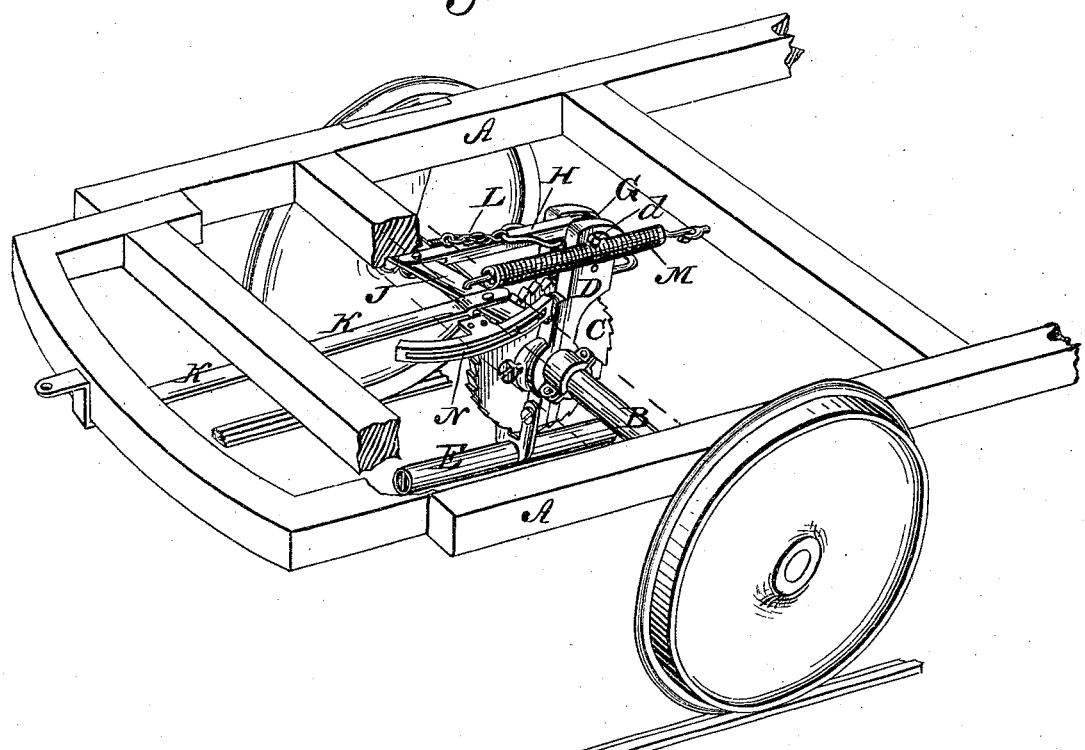
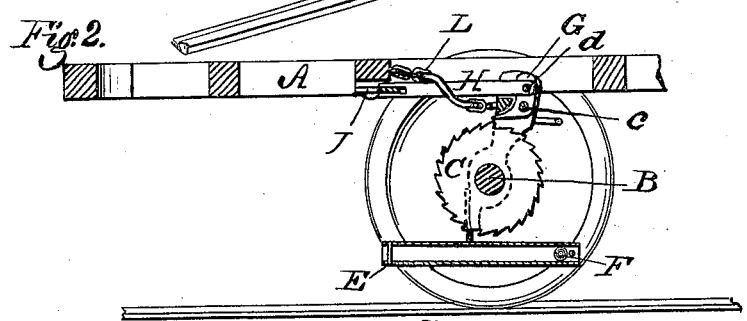
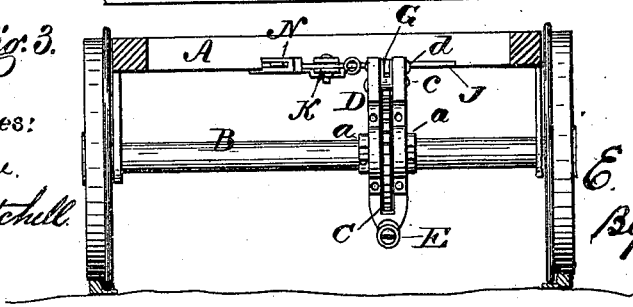
Witnesses:
Will W. Dodge
Donn Twitchell
Inventor:
E. G. Goddard
By Dodge & Son
Attorneys

UNITED STATES PATENT OFFICE.

EZRA G. GODDARD, OF EAST SAGINAW, MICHIGAN.

IMPROVEMENT IN CAR-STARTERS.

Specification forming part of Letters Patent No. 170,546, dated November 30, 1875; application filed September 4, 1875.

*To all whom it may concern:*

Be it known that I, EZRA G. GODDARD, of East Saginaw, in the county of Saginaw and State of Michigan, have invented certain Improvements in Car-Starters, of which the following is a specification:

My invention consists in a novel combination and arrangement of devices for transmitting motion from a sliding draw-bar to a ratchet-wheel on the car-axle, as hereinafter fully explained.

Figure 1 represents a perspective view of my starting devices applied to a car, the forward end of the car-frame and the forward axle only being shown; Fig. 2, a longitudinal vertical section through the middle of the same; Fig. 3, a front elevation of the same.

A represents the frame, and B the forward axle, of an ordinary street-car. C represents a ratchet-wheel, having a central hub or boss, a, on each side, secured firmly on the middle of the axle. D represents a rocking frame, in which the ratchet-wheel revolves, the frame consisting of two upright bars, mounted loosely on the journals a of the wheel, and united at their lower ends by a cross-plate, as shown. E represents a horizontal tube, secured at its middle rigidly to the lower end of the rocking frame D, lengthwise of the car, and having in its interior a loose weight, F, which is free to slide from end to end therein. When the frame is tipped or inclined either forward or backward the tube is thereby inclined, and the weight caused to slide down in the lower end, so as to hold the frame in position, the ball occupying, of course, one end or the other, according to the direction in which the frame is tipped. G represents a pawl or dog, pivoted in the upper end of the frame D, in such a manner as to engage with and turn the ratchet-wheel when the frame is rocked or tipped forward, the engagement and disengagement of the dog being controlled in the manner hereinafter described. As shown in Fig. 2, the pawl or dog is mounted on a pivot, c, passing through its middle into the sides of the frame. H is a horizontal bar, having its rear end attached to the upper end of the pawl G by means of a pivot-pin, d, the ends of which enter slots in the sides of the frame D, for the purpose of limiting the pivotal motion of the dog. J represents a horizontal lever, pivoted at one end to the car-frame, and united, at any desired point between its ends, to the forward end of the bar H, as shown. K represents a sliding draw-bar, mounted in guides under the middle of the car, and connected at its rear end to the free end of the lever J, the bar being extended in front of the car, and adapted to receive the draft devices, and being also provided with a stop-pin, to limit its movement and take the strain when the bar is drawn forward. L is a chain, secured to the upper end of the rocking frame D, and connected at its forward end to the car-frame, for the purpose of limiting the backward movement of the rocking frame. M is a spring, which may be made of any suitable form, connected from the car-frame to the horizontal lever, for the purpose of drawing the latter backward. N is a curved slotted guide, secured to the car-body for the purpose of supporting the free end of the lever.

The operation of the parts is as follows: As the car comes to a rest, and the team ceases pulling, the spring M draws the lever J backward, thereby drawing the bar K inward, and pushing the bar H backward, so that it tips the frame D over backward. As the backward movement of the frame D, in which the pawl is pivoted, is limited by the chain and stopped before the bar H ceases its backward movement, the pressure of the bar against the upper end of the pawl causes the lower end of the latter to rise and remain clear of the ratchet-wheel when the car is at rest or being drawn the other end first. When the car is at rest the parts stand in the positions represented in Fig. 2, the pawl being held clear of the wheel, and the weight resting in the rear end of the tube, so that it tends to hold the frame D from turning forward. When the team is started, the draw-bar K slides forward in its guides, and operates the lever J, which in turn draws forward the bar H. As the frame D is held back by the weight resting in the rear end of the tube, the forward movement of the bar H first causes the pawl to engage with the ratchet-wheel, and then draws the upper end of the frame D with the pawl bodily forward, thereby turning the ratchet-wheel and axle, and starting the car. As the frame turns forward the weight passes down into the forward end of the tube, and serves to urge the frame forward after the movement of the bar H is completed, and while it is holding the upper end of the pawl at rest, the effect of which is to cause the pawl to rise and remain clear of the wheel, while the strain on the draw-bar continues, thereby preventing any noise or clatter, or wear of the dog on the teeth.

It will be observed that the shifting-weight, holding the pawl-carrying frame alternately forward and backward, serves to engage the pawl at the start of the car, and to raise the same after the car is under headway.

The weight, instead of being arranged in the tube, may be arranged to slide on a rod, or pivoted in such a manner as to fall first on one side and then on the other of the frame, the only requirement being that it shall tend to hold the frame alternately forward and backward.

The spring is ordinarily made of such strength that it will prevent the draw-bar from sliding forward the entire distance of which it is capable when the car is running easily, the spring serving in such case as a yielding medium between the car and the draw-bar, and relieving the horses from the sudden and violent strains to which they are subjected when the draw-bar is attached rigidly to the car.

In order to adapt my devices for attachment to cars already in use, I propose to divide the ratchet-wheel and the rocking frame in such manner that they may be secured together around the axle without removing the wheels.

It will, of course, be understood that those cars which are intended to be drawn either end first will be provided with my devices at each end.

Instead of using the toothed wheel and the pawl, a smooth wheel and a friction-dog may be employed without, in any manner, changing the other parts.

Having described my invention, what I claim is—

1. The combination of the ratchet-wheel C, secured upon the car-axle, the rocking frame D, provided with the shifting-weight F, and the pawl G, pivoted in the frame D, and connected with a movable draft-bar, substantially as shown and described.

2. The combination of the wheel C, frame D, shifting-weight F, pawl G, bar H, lever J, draw-bar K, and spring M, substantially as shown.

3. The combination of the frame D, pawl G, bar H, and pivot-pin, passing through the bar and the dog, and having its ends extended into slots in the frame.

EZRA G. GODDARD.

Witnesses:
 WM. A. CLARK,
 WM. A. CLARK, Jr.